(12) United States Patent
Schiffmann et al.

(10) Patent No.: US 12,557,433 B2
(45) Date of Patent: Feb. 17, 2026

(54) ENERGY PRODUCTION SYSTEM WITH ENERGY STORE AND METHOD FOR OPERATING AN ENERGY PRODUCTION SYSTEM

(71) Applicant: SEW-EURODRIVE GMBH & CO. KG, Bruchsal (DE)

(72) Inventors: Sebastian Schiffmann, Kronau (DE); Josef Schmidt, Graben-Neudorf (DE); Matthias Hauck, Schwetzingen (DE); Christian Lampert, Bruchsal (DE); Daniel Tritschler, Bruchsal (DE); Thomas Zöller, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 881 days.

(21) Appl. No.: 14/376,707

(22) PCT Filed: Jan. 28, 2013

(86) PCT No.: PCT/EP2013/000238
§ 371 (c)(1),
(2) Date: Aug. 5, 2014

(87) PCT Pub. No.: WO2013/117305
PCT Pub. Date: Aug. 15, 2013

(65) Prior Publication Data
US 2015/0295412 A1    Oct. 15, 2015

(30) Foreign Application Priority Data

Feb. 7, 2012  (DE) .................... 10 2012 002 185.2

(51) Int. Cl.
*H10F 77/00*  (2025.01)
*H02J 3/32*   (2006.01)
(Continued)

(52) U.S. Cl.
CPC .............. *H10F 77/955* (2025.01); *H02J 3/32* (2013.01); *H02J 3/381* (2013.01); *H02J 1/12* (2013.01);
(Continued)

(58) Field of Classification Search
CPC .. H02J 3/383; H02J 3/32; H02S 10/20; H01F 77/00
See application file for complete search history.

(56) References Cited

U.S. PATENT DOCUMENTS 4,636,931 A * 1/1987 Takahashi ................. H02J 7/35
                                                    136/293
6,259,017 B1 * 7/2001 Takehara .................. G05F 1/67
                                                    136/244
(Continued)

FOREIGN PATENT DOCUMENTS

CN    101841256 A    9/2010
CN    102088244 A    6/2011
(Continued)

OTHER PUBLICATIONS

International Search Report, dated May 9, 2014, issued in corresponding International Application No. PCT/EP2013/000238.
(Continued)

*Primary Examiner* — Adi Amrany
(74) *Attorney, Agent, or Firm* — Carter, DeLuca & Farrell LLP

(57) ABSTRACT

An energy production system with energy store and method for operating an energy production system, solar cells, particularly a module including solar cells, being connected to an inverter, especially at its DC-side terminal, the inverter being connected at its terminal on the alternating-voltage side to a power consumer and/or an AC system, a DC/DC converter being connected, especially with its first DC-side
(Continued)

terminal, in parallel to the solar cells, particularly to the module including solar cells, the DC/DC converter being connected to an energy store, particularly which is connected to the second DC-side terminal of the DC/DC converter.

15 Claims, 7 Drawing Sheets

(51) Int. Cl.
*H02J 3/38* (2006.01)
*H02J 1/12* (2006.01)
*H02J 7/35* (2006.01)

(52) U.S. Cl.
CPC ............. *H02J 7/35* (2013.01); *H02J 2300/26* (2020.01); *Y02E 10/56* (2013.01); *Y02E 70/30* (2013.01)

(56) References Cited

U.S. PATENT DOCUMENTS

| | | | | |
|---|---|---|---|---|
| 8,493,020 | B2* | 7/2013 | Lee | H01M 10/465 307/66 |
| 8,618,456 | B2* | 12/2013 | Hinman | H02H 7/1222 250/203.4 |
| 2004/0174720 | A1* | 9/2004 | Kurokami | H02M 7/53871 363/16 |
| 2005/0006958 | A1* | 1/2005 | Dubovsky | H02J 3/382 307/64 |
| 2006/0132102 | A1* | 6/2006 | Harvey | G05F 1/67 320/166 |
| 2006/0192435 | A1 | 8/2006 | Parmley | |
| 2007/0103108 | A1* | 5/2007 | Capp | H02J 7/35 320/101 |
| 2009/0059630 | A1* | 3/2009 | Williams | H02M 3/1588 363/60 |
| 2009/0086520 | A1* | 4/2009 | Nishimura | H02M 3/33576 363/133 |
| 2010/0008119 | A1* | 1/2010 | O'Brien | H01L 31/02021 363/132 |
| 2010/0156185 | A1* | 6/2010 | Kim | H01M 16/003 307/72 |
| 2010/0156363 | A1* | 6/2010 | Chiu | H02J 7/0091 323/274 |
| 2010/0231045 | A1* | 9/2010 | Collins | F01B 21/04 307/47 |
| 2011/0134668 | A1 | 6/2011 | Cho | |
| 2011/0160930 | A1* | 6/2011 | Batten | H02J 3/386 700/298 |
| 2011/0210608 | A1* | 9/2011 | O'Brien | H02J 3/383 307/31 |
| 2011/0210614 | A1 | 9/2011 | Min | |
| 2011/0211369 | A1* | 9/2011 | Mulcahy | H02M 3/285 363/20 |
| 2011/0273130 | A1* | 11/2011 | Lee | H01M 10/465 320/101 |
| 2012/0047386 | A1* | 2/2012 | Matsui | H02J 3/46 713/340 |
| 2012/0056484 | A1* | 3/2012 | Mumtaz | H01L 31/02021 307/86 |
| 2012/0188806 | A1* | 7/2012 | Tamura | H02J 3/383 363/95 |
| 2012/0205974 | A1* | 8/2012 | McCaslin | H02J 3/381 307/18 |
| 2013/0030587 | A1* | 1/2013 | El-Barbari | H02J 3/00 700/292 |
| 2013/0062942 | A1 | 3/2013 | Hantschel | |
| 2013/0181529 | A1* | 7/2013 | Tang | H02J 3/383 307/82 |

FOREIGN PATENT DOCUMENTS

| | | |
|---|---|---|
| DE | 10 2010 000 350 | 8/2011 |
| DE | 10 2010 016 138 | 9/2011 |
| DE | 10 2011 110 197 | 3/2012 |
| EP | 2 339 714 A2 | 6/2011 |

OTHER PUBLICATIONS

International Preliminary Report on Patentability, dated Aug. 21, 2014, issued in corresponding International Application No. PCT/EP2013/000238.

European Office Action issued in European Patent Application No. 13 703 523.4, dated Mar. 10, 2016.

Velasco, D., et al., Photovoltaic Power Management System with Grid Connected and Islanded Operation, IEEE International Symposium on Industrial Electronics, Gdansk, Jun. 27-30, 2011, XP032019270, DOI: 10.1109/ISIE.2011.5984377.

International Search Report in PCT/EP2013/000238 mailed Sep. 5, 2014 [English Translation].

* cited by examiner

ENERGY PRODUCTION SYSTEM WITH ENERGY STORE AND METHOD FOR OPERATING AN ENERGY PRODUCTION SYSTEM

FIELD OF THE INVENTION

The present invention relates to an energy production system having an energy store and a method for operating an energy production system.

BACKGROUND INFORMATION

It is generally known that illuminated solar cells generate electrical energy in the form of DC current which is able to be supplied to an inverter at its DC-side terminal.

SUMMARY

Therefore, the object of the present invention is to further develop an energy production system.

Features of the present invention with regard to the energy production system having an energy store are that a solar generator, particularly a module including solar cells, is connected to an inverter, especially at its DC-side terminal, the inverter being connected at its terminal on the alternating-voltage side to a power consumer and/or an AC system, a DC/DC converter being connected, especially with its first DC-side terminal, in parallel to the solar generator, particularly to the module or modules containing solar cells, the DC/DC converter being connected to an energy store, particularly which is connected to the second DC-side terminal of the DC/DC converter.

Instead of a DC/DC converter, a different power converter may also be used.

The advantage in this context is that the inverter, espiecally the MPP tracker of the inverter, continues to operate undisturbed, in spite of the additionally connected energy store. The reason is that the working curves of the DC/DC converter are selectable in such a way that the flow of energy into or out of the energy store is indeed controllable. Nevertheless, however, the power maximum of the electrical energy generated by the solar generator is detectable in the same manner by the MPP tracker, thus, the Maximum Power Point Tracker.

Consequently, existing solar installations which have a solar generator and an inverter for feeding the energy generated into the grid are able to be retrofitted with an energy store by connecting the DC/DC converter in parallel to the solar generator. Thus, energy is able to be fed as needed by the solar generator via the DC/DC converter into the energy store. Correspondingly, energy may be supplied from the energy store to the inverter when there is corresponding need, e.g., at night or when the light intensity of the solar generator is too low.

In one advantageous development, a film capacitor is connected in parallel to the solar generator, especially to the module containing solar cells. This is advantageous because high-frequency voltage fluctuations are able to be buffered.

In one advantageous refinement, the energy store has a double-layer capacitor and/or is made up of a plurality of double-layer capacitors interconnected to each other and/or the energy store has an accumulator and/or a battery. The advantage in this instance is that very high capacitances may be made available in cost-effective manner, accompanied by low mass of the energy store.

In one advantageous development, the inverter has an MPP tracker. The advantage in this case is that the MPP tracker controls the operating point of maximum power of the solar generator. Therefore, even given fluctuating operating conditions such as temperature fluctuations and/or fluctuations in light intensity, the maximum power output is attainable in the case of the solar generator. To that end, the inverter regulates to the voltage associated with this operating point by applying small changes in voltage and determining the power setting in as a result. The voltage is then altered step-by-step in the direction in which the power increases.

Features with regard to the method for operating an energy production system are that a solar generator, especially modules including one or more solar cells, is connected to an inverter, particularly at its DC-side terminal, the inverter being connected at its terminal on the alternating-voltage side to a power consumer and/or an AC system, in particular, the inverter having an MPP tracker, electrical energy being supplied to the inverter from an energy store via a DC/DC converter, voltage available at the inverter on the DC side being detected, and a setpoint power to be delivered by the DC/DC converter to the DC-side terminal of the inverter being determined according to a characteristic curve.

The advantage in this context is that the characteristic curve is selectable in such a way that the discovery of the operating point having the maximum power generated by the solar generator is permitted in unchanged manner.

In one advantageous refinement, the setpoint power delivered by the DC/DC converter to the DC-side terminal of the inverter is determined, particularly by multiplying the voltage present on the DC side with the current delivered by the DC/DC converter to the inverter, and determining the current to be delivered by the DC/DC converter to the inverter based on the difference between the setpoint power and the actual power, in doing which, further influence variables such as operating mode, behavior of the MPP tracker of the inverter or the like especially being taken into account. The advantage in this instance is that the amount of electric power to be fed from the energy store to the DC-side terminal of the inverter or to be removed from there is controllable based on the input selection of the characteristic curve of the DC/DC converter.

In one advantageous refinement, the characteristic curve represents a correlation of such a kind between power and DC-side voltage that after addition of the corresponding power-voltage characteristic curve of the solar generator, the value of the voltage at which a maximum of power is present remains essentially unchanged. The advantage in this case is that the method of operation of the MPP tracker proceeds in a manner essentially undisturbed, even though the DC/DC converter is additionally connected in parallel to the solar generator.

In one advantageous refinement, the characteristic curve is changeable so little that after addition of the corresponding power-voltage characteristic curve of the solar generator, the value of the voltage at which a maximum of power exists remains essentially unchanged, especially so that the MPP tracker regulates to the same power maximum of the solar generator as if no energy store with DC/DC converter were present. The advantage in this case is that again, the method of operation of the MPP tracker proceeds in a manner essentially undisturbed, even though the DC/DC converter is additionally connected in parallel to the solar generator.

Features with regard to the method for operating an energy production system are that an inverter having an MPP tracker detects the DC-side input current and regulates the voltage at its DC-side terminal to a maximum of power, energy-generation means, especially a solar generator, being connected to its DC-side terminal, a device being connected to the DC-side terminal, which from the voltage detected on the DC side and taking a characteristic curve into account, determines a setpoint power, and ascertains the actual current delivered by the device to the DC-side terminal of the inverter as well as the voltage present at the DC side of the inverter, and from that, determines an actual power which the device regulates to the setpoint power by determining a corresponding setpoint current and regulating to that, in particular, the characteristic curve representing the dependence of the setpoint power on the voltage present at the inverter on the DC side, in particular, the characteristic curve being alterable with the aid of a primary control action.

The advantage in this instance is that the DC/DC converter has a current controller which is subordinate to a power controller or a power-determination means, a characteristic curve being used by which the power of the energy store is able to be managed. This power management is able to be carried out regardless of the method of operation of the inverter together with MPP tracker.

In one advantageous refinement, the characteristic curve is altered, especially expanded or compressed, accordingly by influence variables. The advantage here is that the ordinate values are multiplied with a factor as a function of the influence variables. Thus, an adjustment to influence variables is conceivable by simple arithmetic operations.

In one advantageous development, the preceding sign of the characteristic curve is a function of the operating mode, especially the drawing of energy from or the feeding of energy into the energy store. This is advantageous because the drawing or feeding, thus, the direction of the energy flow, is controllable by the preceding sign.

In one advantageous development, the characteristic curve has an essentially constant setpoint-power value in a voltage range which includes the specific voltage value that is assigned to the power maximum of the solar generator, especially which is assigned to the power maximum of the solar generator in the case of all light intensities of the solar generator. This is advantageous because the result of a flat characteristic curve in this voltage range is that the MPP tracker operates undisturbed.

In one advantageous refinement, the characteristic curve has a locally minimal progression of the setpoint power values as a function of the voltage in a voltage range that includes the specific voltage value which is assigned to the power maximum of the solar generator, especially which is assigned to the power maximum of the solar generator in the case of all operating conditions such as permissible temperatures and light intensities of the solar generator. The advantage in this instance is that with the aid of the local minimum, the flow of power out of or into the energy store is adjustable accordingly as a function of voltage.

Further advantages are derived from the dependent claims. The present invention is not limited to the feature combination of the claims. Further useful combination possibilities of claims and/or individual claim features and/or features of the specification and/or of the figures are apparent for one skilled in the art, particularly from the problem definition and/or the objective set by comparison with the related art.

DETAILED DESCRIPTION

Figure 1:
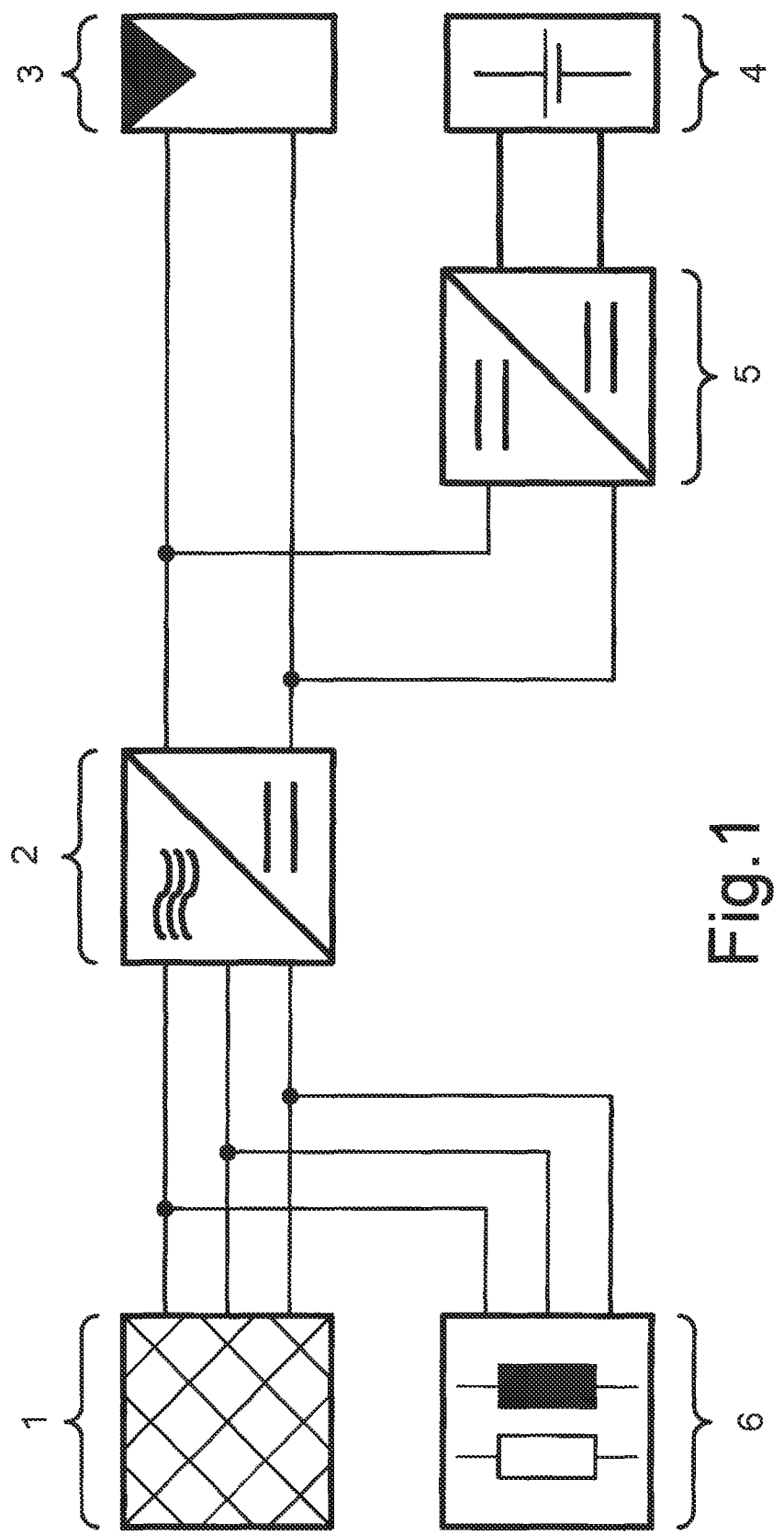
FIG. 1 shows a schematic of a decentralized energy production system according to the present invention with energy store 4.

As shown in FIG. 1, the system has a solar generator 3 which, when exposed to light, makes electrical energy available, particularly in the form of a unipolar voltage, especially DC voltage. Solar generator 3 is connected to an inverter 2, whose especially single-phase or multiphase AC output is connected to corresponding power supply system 1.

A DC/DC converter 5 is connected in parallel to solar generator 3, so that energy is able to be supplied from an energy store 4 to inverter 2.

On the line side, power consumers are also disposed as load 6 at the AC output of inverter 2.

Figure 2:
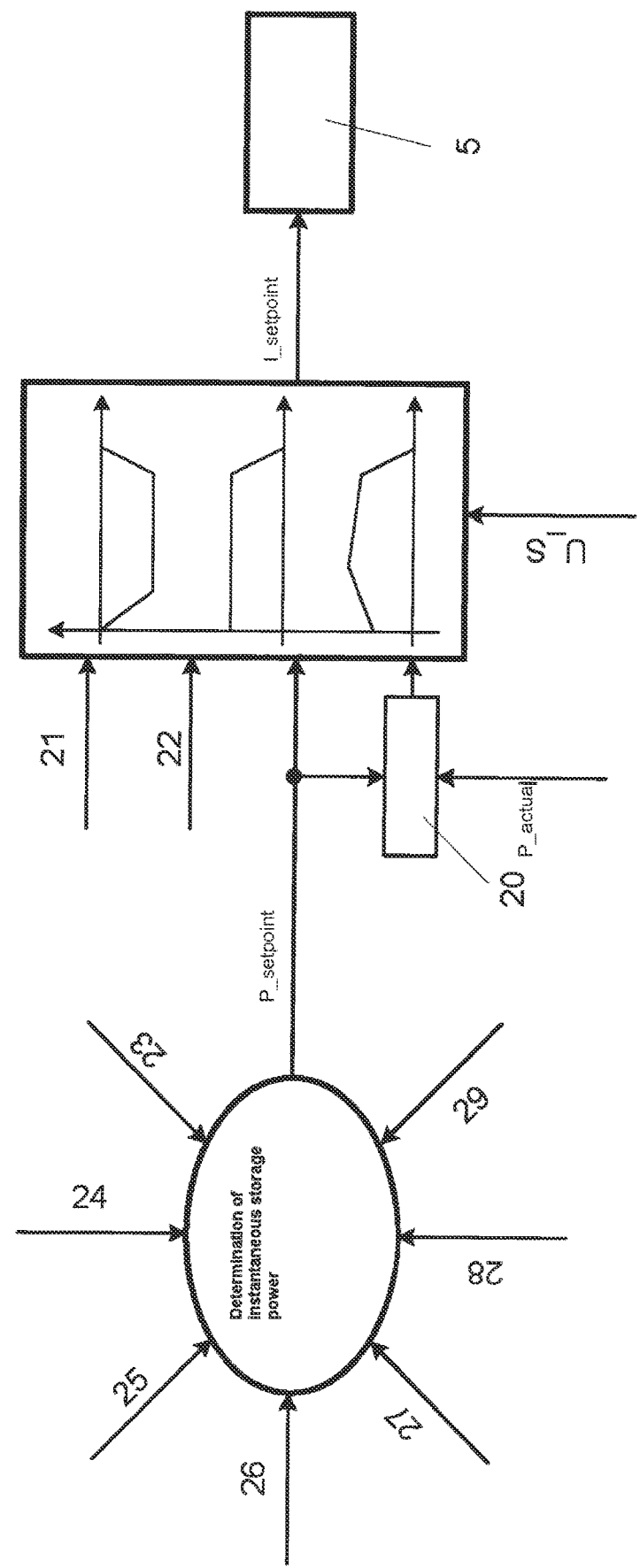
FIG. 2 shows the consideration of the superordinate influencing variables on the method of operation of energy store 4.

As shown in FIG. 2, a setpoint power P_setpoint is determined based on influence variables such as market price 23, load prediction 24, storage level 25, amount of energy stored in energy store 4 able to be made available, local consumption 26, solar power 27, requirements 28 of the power supply system operator or of a superordinate control and/or weather forecast 29.

Output-side current I_actual of DC/DC converter 5 and output-side voltage U_actual=U_S are ascertained, and from that, actual power P_actual is determined.

From the difference between actual power P_actual and setpoint power P_setpoint determined in a tracking 20, a value is determined that, like setpoint power P_setpoint, is supplied to a determination block which, taking into account behavior 21 of the MPP tracker and operating mode 22 as well as voltage U_S, determines a current setpoint value I_setpoint, to which the current fed by DC/DC converter 5 to parallel-connected inverter 2 is regulated.

Figure 3:
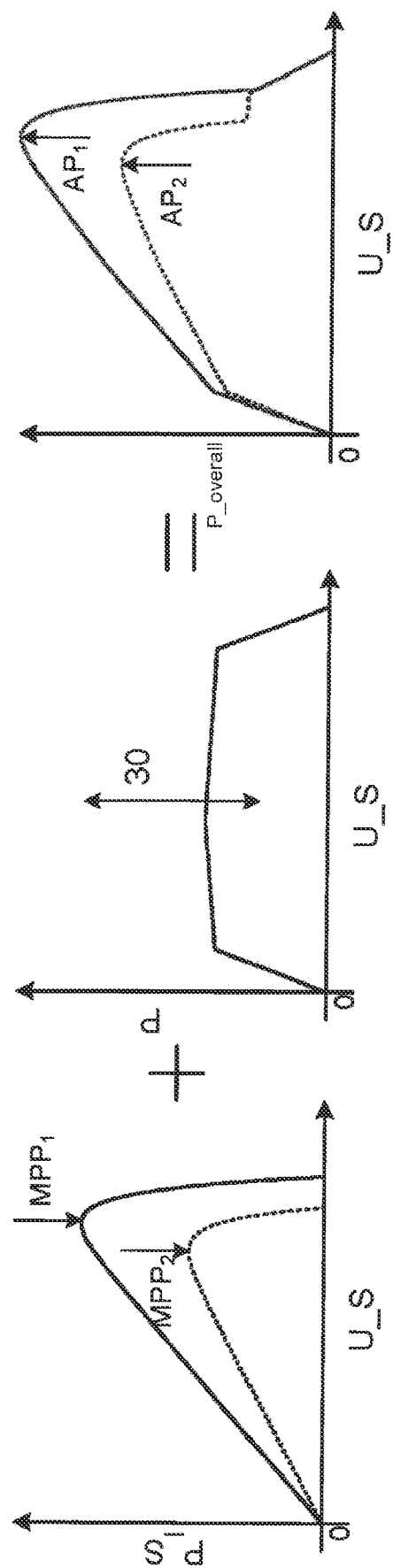
FIG. 3 shows the generation of a working curve of the system for the state when energy is released from store 4, especially during daylight.

As shown in FIG. 3, in this manner, the MPP tracker is allowed to find the point of maximum power, undisturbed by DC/DC converter 5 additionally connected to solar generator 3. In so doing, the MPP tracker changes voltage U_S applied in each instance to solar generator 3 by a small amount, and determines the instantaneous power from the detected current thereby resulting. In this manner, the voltage is altered in such a way that the operating point of essentially maximum power is constantly set for solar generator 3.

To that end, in the left graphic representation in FIG. 3, the power of the solar generator is shown as a function of voltage U_S applied to solar generator 3. In case of altered operating conditions, especially lower light intensity, the dotted characteristic curve applies instead of the solid characteristic curve. In each instance, the optimum of the power is found with the search method of the MPP tracker described, or at least the operating point is regulated to this optimum.

As shown in the middle graphic representation in FIG. 3, the power to be made available by DC/DC converter 5 is determined according to a characteristic curve as a function of voltage U_S. Reference numeral 30 represents the primary control action on this characteristic curve, since the characteristic curve is altered, especially expanded in the ordinate direction as shown in the procedure according to FIG. 2.

In general, the characteristic curves resemble each other in that, in the case of voltage U_S increasing from 0, they all initially increase steeply to an almost constant range, from which, at high voltage U_S, they drop sharply again. In this context, the almost constant range has a local maximum which is established in such a way that the voltage belonging to it is less than or equal to all possible MPP voltages of the solar generator. It is important that the changes in the almost constant range are smaller than the changes in the characteristic curve of the solar cell in the same voltage range, but great enough to be detected by the MPP tracker, if no solar power is available. Thus, in the case of the added characteristic curve, the maximum remains essentially at the same voltage values.

Moreover, this method ensures that in the event of a sudden sharp drop of the MPP voltage of the solar generator, e.g., because of cloud shadowing, the new MPP of the solar generator is always reliably recognized.

Thus, it is atvantageous that in the case of simultaneous infeed, thus, power supplied to the inverter from the solar generator and the store, as shown in FIG. 3, it is ensured that after a shadowing, the MPP tracker again controls to an operating point of maximum power (MPP) below the instantaneous solar voltage.

Therefore, depending on the influence variables, a suitable characteristic curve is thus determined and it, in turn, is used to determine instantaneous setpoint power P to be made available.

As shown in FIG. 3, the sum of the two indicated characteristic curves leads to a characteristic curve whose maximum is located at essentially the same place. Therefore, the method of operation of the MPP tracker remains undisturbed, for by varying the voltage, it continues to find the operating point having the greatest power generated by the solar generator.

Figure 4:
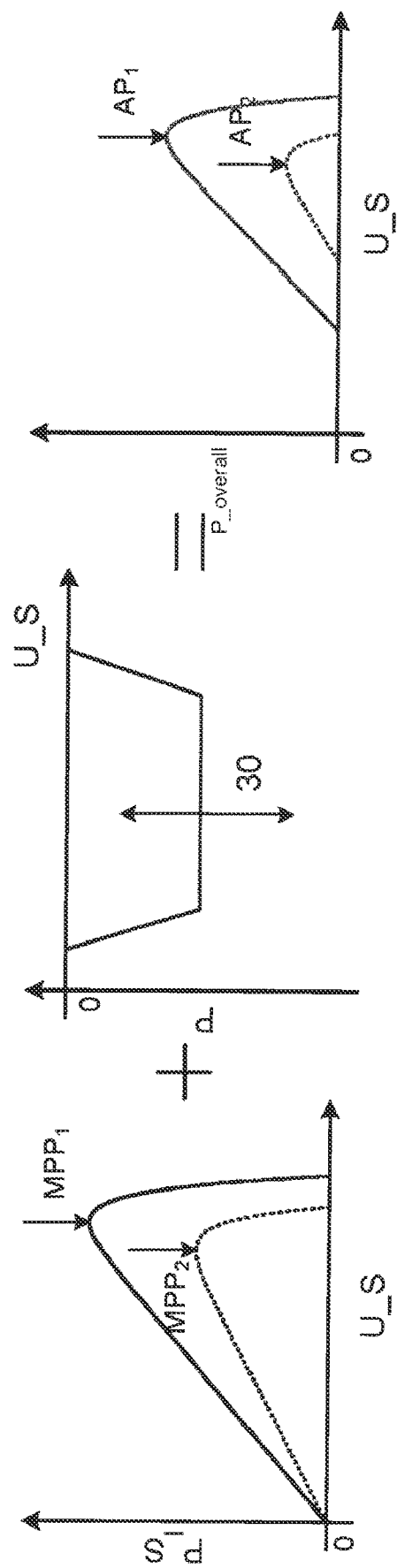
FIG. 4 shows the generation of a working curve of the system for the state when energy is absorbed into store 4, especially during daylight.

FIG. 4 shows the corresponding characteristic curves for the absorption of energy into energy store 4 during the day, thus, when solar generator 3 is generating electric power. The method of operation of the MPP tracker remains undisturbed here, as well.

Figure 5:
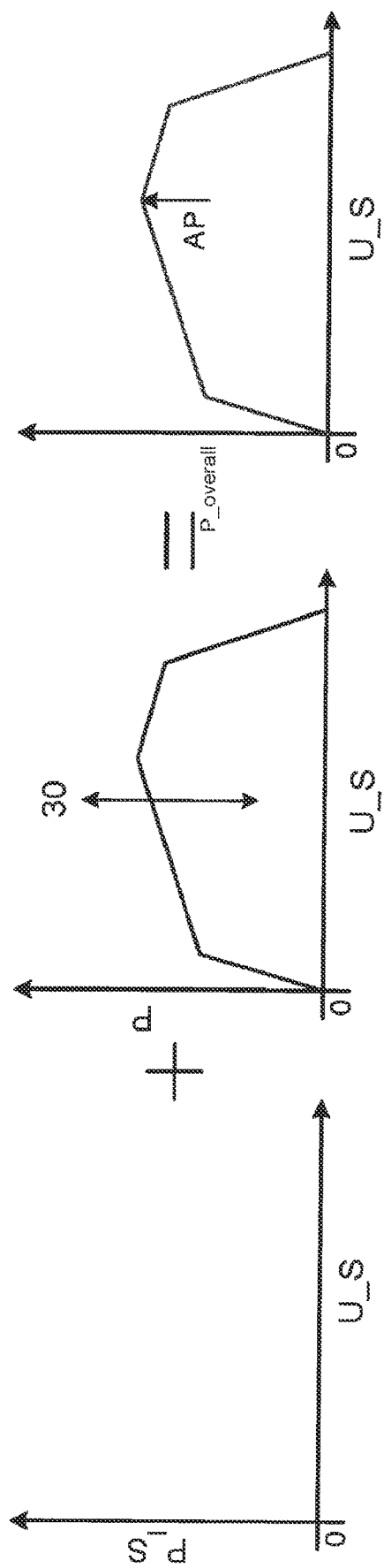
FIG. 5 shows the generation of a working curve of the system for the state when energy is released from store 4, especially at night.
Figure 6:
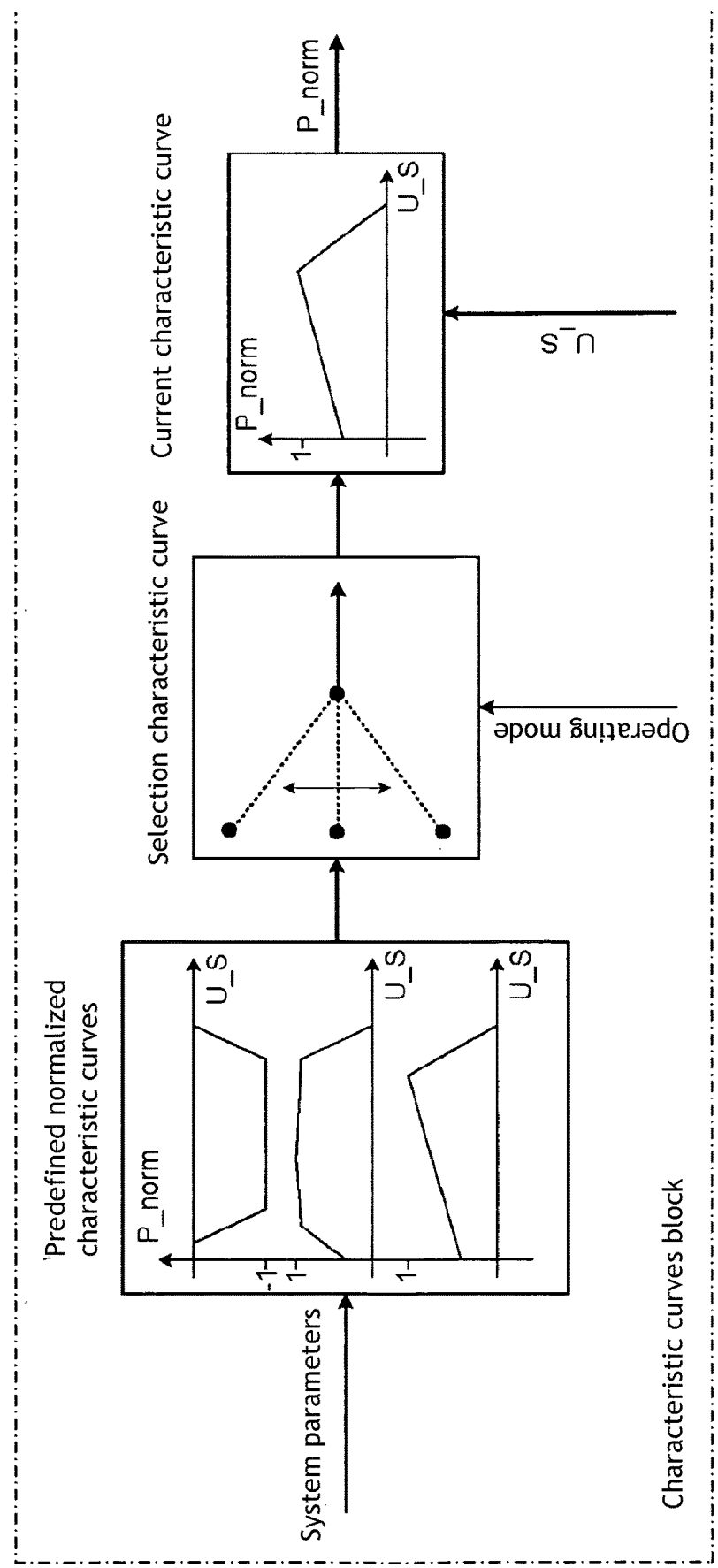
FIG. 6 shows a first part and FIG. 7 an additional section of a characteristic curve block.
Figure 7:
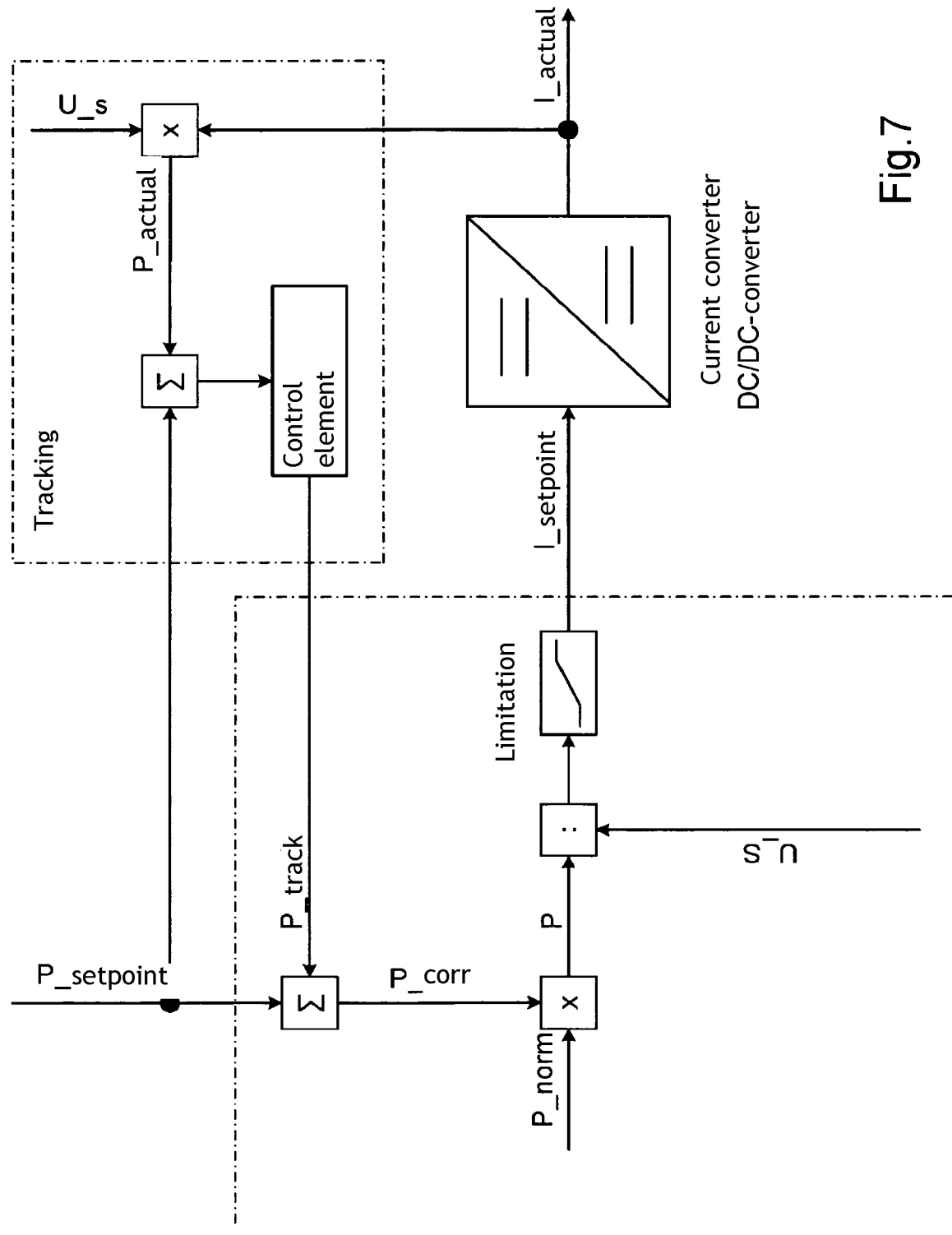

FIG. 5 shows the state when solar generator 3 is not illuminated, which means it is then generating no electric power. The correspondingly predefined characteristic curve has a maximum, and the MPP tracker controls to this maximum and therefore to the operating point predefined for it. Preferably, the maximum is located at the optimal operating point of the DC/DC converter and/or of the overall system.

Thus, it is important in the present invention that by selecting a suitable characteristic curve from a family of characteristic curves in each case able to be activated by the primary control action, the method of operation of the MPP tracker remains undisturbed in comparison to non-existent energy store 4 with DC/DC converter 5.

Consequently, an existing system without energy store 4 and DC/DC converter 5 is able to be retrofitted, the previous system continuing to operate undisturbed. By selecting a characteristic curve for the power determination of the DC/DC converter, which does not qualitatively alter the characteristic curve of solar generator 3, the MPP tracker continues to find the optimal operating point.

In each instance, different characteristic curves are used in different operating modes. A first operating mode corresponds to the case of illuminated solar generator 3 and energy release from energy store 4. A third operating mode corresponds to the case of unilluminated solar generator 3 and energy release from energy store 4. A second operating mode corresponds to the case of illuminated solar generator 3 and energy absorption into energy store 4. In each of the operating modes, the respective characteristic curve is expanded or compressed as a function of primary control action 30. However, the characteristic curves used in the case of the three operating modes indicated do not merge into each other by expansion or compression. In particular, the characteristic curve of the second operating mode has a different preceding sign than the characteristic curve of the first operating mode. In addition, the characteristic curve of the second operating mode has no local maximum, but rather a minimum which is realized as a plateau. In the case of the third operating mode, the characteristic curve has a single distinct extremum, so that the MPP tracker finds this operating point.

The inverter thus has a DC terminal, to which solar generator 3 and DC/DC converter 5 are connected. In addition, it has an AC terminal, at which it is connected to AC system 1 and at least one power consumer.

Preferably, the inverter is implemented at its AC-side terminal for a single-phase or a three-phase power supply system.

In a further exemplary embodiment according to the present invention, a rotary storage device is used as energy store, in which case, instead of the DC/DC converter, a DC/AC converter is used, the alternating-current terminals AC being connected to the rotary storage device. Therefore, to simplify matters, to be understood by a power converter in this document is either a DC/DC converter for an energy store such as a capacitor, accumulator or battery, or a DC/AC converter for a rotary storage device.

LIST OF REFERENCE NUMERALS

1 Power supply system
2 Inverter with MPP tracker
3 Solar generator, especially modules including one or more solar cells
4 Energy store
5 DC/DC converter
6 Load, power consumer
20 Tracking
21 Behavior of the MPP tracker
22 Operating mode
23 Market price
24 Load prediction
25 Storage level, amount of energy stored in energy store 4 able to be made available
26 Local consumption
27 Solar power P_setpoint
28 Requirements of the power supply system operator or of a primary control
29 Weather forecast
30 Primary control action P_setpoint Setpoint power
P_actual Actual power
I_setpoint Setpoint current
I_actual Actual current
U_S Solar voltage
P Storage power
P_S Solar power
P_overall Overall power

What is claimed is:

1. An energy production system, comprising:
an energy store;
an inverter including a maximum power point (MPP) tracker, a terminal on an alternating-voltage side of the inverter being connected to a power consumer and/or an AC system;
a solar generator connected to the inverter; and
a power converter connected, in parallel to the solar generator, to the energy store;
wherein the power converter is adapted to deliver power to a DC-side terminal of the inverter according to a first characteristic curve that represents dependence of the power deliverable by the power converter to the DC-side terminal of the inverter and voltage present at the DC-side terminal of the inverter, the first characteristic curve includes a predetermined voltage value at which the power deliverable by the power converter to the DC-side terminal of the inverter is at a maximum;
wherein the solar generator is adapted to deliver power to the DC-side terminal of the inverter according to a second characteristic curve that represents dependence of the power deliverable by the solar generator to the DC-side terminal of the inverter and the voltage present at the DC-side terminal of the inverter;
wherein the power converter is adapted to change the first characteristic curve so that a voltage value at the DC-side terminal of the inverter at which a maximum combined power is deliverable by the power converter and by the solar generator to the DC-side terminal of the inverter, represented by addition of the first characteristic curve and the second characteristic curve, corresponds to the predetermined voltage value at which the power deliverable by the power converter to the DC-side terminal of the inverter is at the maximum; and
wherein the power converter is adapted to deliver power to the DC-side terminal of the inverter according to a third characteristic curve that represents dependence of the power deliverable by the power converter to the DC-side terminal of the inverter and the voltage present at the DC-side terminal of the inverter during times that no power is delivered to the DC-side terminal of the inverter by the solar generator, the third characteristic curve having a single distinct maximum at a predetermined voltage value.

2. The energy production system as recited in claim 1, wherein the solar generator includes modules including one or more solar cells.

3. The energy production system as recited in claim 1, wherein the solar generator is connected to a DC-side terminal of the inverter.

4. The energy production system as recited in claim 1, wherein a first DC-side terminal of the power converter is connected to the solar generator and inverter.

5. The energy production system as recited in claim 4, wherein the energy store is connected to a second DC-side terminal of the power converter.

6. The energy production system as recited in claim 1, wherein at least one of:
the power converter is a DC/DC converter connected to the energy store, and the energy store includes a rotary storage device, and the power converter is a DC/AC converter connected to the rotary storage device.

7. The energy production system as recited in claim 6, wherein the energy store includes a rotary storage device that includes an electromechanical energy converter, and the power converter is a DC/AC converter connected to the rotary storage device.

8. The energy production system as recited in claim 7, wherein the electromechanical energy converter includes an electric machine operable in one of a motor mode and a generator mode.

9. The energy production system as recited in claim 1, further comprising:
a film capacitor connected in parallel to the solar generator.

10. The energy production system as recited in claim 1, wherein at least one of:
the energy store at least one of includes a double-layer capacitor and is made up of a plurality of double-layer capacitors interconnected to each other, and the energy store includes at least one of an accumulator and a battery.

11. The energy production system as recited in claim 1, wherein the time that no power is delivered to the DC-side terminal of the inverter by the solar generator includes night times.

12. The energy production system as recited in claim 1, wherein the first characteristic curve has a substantially constant value in a voltage range that includes the predetermined voltage value at which the power deliverable by the power converter to the DC-side terminal of the inverter is at the maximum.

13. The energy production system as recited in claim 1, wherein the power converter is adapted to alter the third characteristic curve.

14. The energy production system as recited in claim 1, further comprising a device adapted to determine actual power delivered by the power converter to the DC-side terminal of the inverter.

15. The energy production system as recited in claim 14, wherein the device is adapted to determine the actual power delivered by the power converter by multiplication of the voltage present on the DC-side terminal of the inverter by current delivered by the power converter to the inverter.

* * * * *